May 17, 1966  S. R. RUDISELL  3,251,413
SECONDARY RECOVERY FROM PLURAL PRODUCING HORIZONS
Filed May 9, 1963
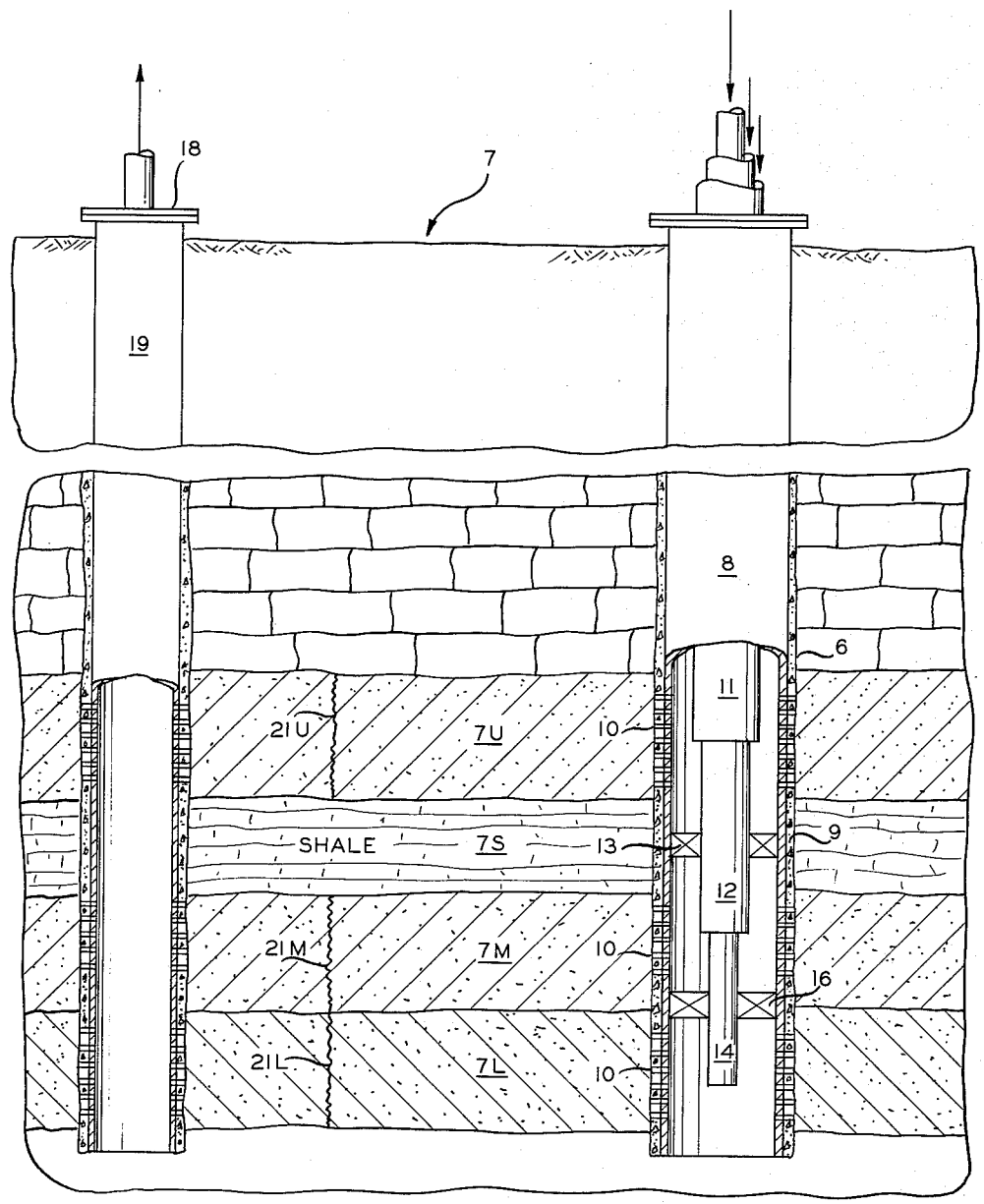
INVENTOR.
S. R. RUDISELL
BY Young & Quigg
ATTORNEYS

United States Patent Office

3,251,413
Patented May 17, 1966

3,251,413
SECONDARY RECOVERY FROM PLURAL
PRODUCING HORIZONS
Stanley R. Rudisell, Bartlesville, Okla., assignor to Phillips Petroleum Company, a corporation of Delaware
Filed May 9, 1963, Ser. No. 279,186
8 Claims. (Cl. 166—10)

This invention is concerned with the secondary recovery of petroleum oil from partially depleted, subterranean oil-bearing reservoirs. It is more specifically concerned with increasing the recovery efficiency of petroleum oil from oil-bearing formations having adjacent zones, each of which have a substantially uniform permeability but which vary in permeability relative to each other.

One of the practical methods of secondary recovery which has long been employed is so-called "water-flooding." In this general method, water is the fluid which is pumped through an injection well and into a permeable oil bearing formation which has been penetrated by producing wells that have been depleted by primary recovery methods. For many years now water flooding has been employed so as to permit production of substantial increments of oil from depleted wells. However, it is appreciated that presently known water flooding techniques are not as effective as might be desired. In this connection, for example, it is generally true that of the total oil originally present in a reservoir, after primary recovery methods and after water flooding secondary recovery techniques, some 33% or more of the oil may still remain in the reservoir. Thus water flooding techniques, like primary recovery methods, have definite economic limits of application which presently necessitate termination of oil production substantially before all recoverable oil is obtained.

Subterranean fluids such as petroleum oil, gas and/or water are generally found in petroleum reservoirs or formations which are sedimentary beds, or strata, sufficiently homogeneous to be regarded as a unit. These fluids can be found distributed throughout the formation, or only in intervals or zones of the formation. Although a formation can be substantially uniform in permeability and composition, formations do occur which vary transversely in actual permeability due to the presence of random zones which vary respectively in permeability each to the other, sometimes called permeability stratification. For example, one zone will have a low permeability, viz. 50 millidarcies, while the adjacent zone has a high permeability, viz. 500 millidarcies. (Vide Oil and Gas Journal, May 13, 1957, at page 98 et seq.) In recovering residual oil from partially depleted zones which are contiguous and have a variable permeability of this nature, a number of problems can occur. In flooding multiple oil-bearing zones by means of a flood water, the injected water will tend to channel through the more permeable horizon leaving otherwise normally recoverable oil behind in the tight sand, or less permeable horizon, resulting in a sweep efficiency at water breakthrough well below what is normally expected.

In addition to formations wherein contiguous zones vary in actual permeabilities, each to the other, petroleum is produced from reservoirs having vertical sections which are substantially uniform throughout in actual permeability, but which have adjacent zones varying in the resistance offered, relative to each other, to the flow of fluids therethrough. Reservoirs which have these characteristics are those in which a gas zone, either because of the existence of a gas cap or because of extensive gravity drainage, is present above the oil zone from which the oil is to be recovered. It is important in fields where adjacent gas and oil zones exist that the two zones be isolated from one another in order to prevent channeling of the drive fluid, such as water, through the gas zone which leaves the oil zone substantially unflooded.

Appreciating these and other deficiencies in the manner in which multiple horizon water floods are effected in secondary recovery, many suggestions have been made to improve water flooding. For example, it has been suggested to secure selective plugging of the permeable oil bearing formation being treated so as to partially seal off the more permeable paths for water fingering. However selective plugging techniques are generally expensive and require close control, particularly where plugging along the permeability interface of contiguous strata is to be attempted.

Thus, two major conditions are found in partially depleted, hydrocarbon bearing geological formations that cause adjacent horizons to have substantially different effective permeabilities: (1) formations having horizontal sections which are substantially uniform throughout in actual permeability but which have adjacent horizons varying in the resistance offered, relative to each other, to the flow of fluids therethrough, and (2) adjacent horizons which are substantially uniform throughout in actual permeability as well as relative to one another, but in which the formation fluid viscosities vary significantly, relative to each other, for adjacent horizons.

It is, therefore, an object of this invention to increase the secondary recovery efficiency of hydrocarbons from a partially depleted, hydrocarbon-bearing formation having a plurality of adjacent horizons of substantially different effective permeabilities.

It is another object of this invention in secondary recovery to reduce channeling behind the casing seal of a bore hole penetrating a hydrocarbon-bearing formation characterized by adjacent horizons of differing actual permeabilities.

A yet further object in secondary recovery from a hydrocarbon-bearing formation having a plurality of adjacent horizons of different effective permeabilities is to match the absolute pressures, pressure gradients and injection volumes of the several horizons so that injection fluids drive thru said horizons at substantially uniform rates, with negligible cross flow of fluids between adjacent horizons.

According to the present invention, there is provided a method of secondary recovery being conducted in a hydrocarbon-bearing geological formation having a plurality of adjacent horizons, said horizons having substantially different effective permeabilities, and in which one injection well and at least one producing well penetrates said formation, comprising: injecting a separately viscosified driving fluid into each of said horizons, the viscosity of each of said driving fluids being selected so as to match the absolute pressures, pressure gradients and injection volumes of the several horizons, so that the injected fluids drive the formation hydrocarbons through said horizons to said producing well at substantially uniform rates, whereby the sweep efficiency throughout said multiple horizons formation is significantly improved.

In another embodiment of the invention, there is provided a method of secondary recovery being conducted in a hydrocarbon-bearing geological formation having a plurality of adjacent horizons, said horizons having substantially uniform effective permeabilities, but in which the formation fluid viscosities vary significantly relative to each other for said adjacent horizons, and in which one injection well and at least one producing well penetrate said formation, comprising: injecting a differently viscosified driving fluid into each of said horizons from said injection well, the viscosity of each of said driving fluids being selected so as to match the absolute pressures, pressure gradients and injection volumes of the several horizons, whereby the injected fluids drive the formation hydrocarbons through said horizons to said producing well at substantially uniform rates.

In a third embodiment of this invention, not only do the several horizons have substantially different effective permeabilities, but the formation fluid viscosities vary significantly relative to each other for adjacent horizons, there is provided a method of injecting a differently viscosified driving fluid into each of said horizons from said injection well, the viscosity of each of said driving fluids being selected so as to match the absolute pressures, pressure gradients and injection volumes of the several horizons, whereby the injected fluids drive the formation hydrocarbons through said horizons to said producing well at substantially uniform rates.

Sweep efficiency is defined as the fraction of the volume of the well pattern which has been contacted by the displacing fluids.

It has been found that certain agents are particularly effective in increasing the viscosity of water so as to form a highly viscous aqueous solution for use in this invention. These agents have the property of dissolving in water so as to increase the viscosity of water in a substantially semilogarithmic relation with concentration. As a result, exceedingly small proportions of these agents are operative to increase the viscosity of water sufficiently for use in this invention.

There are several viscosifying agents which may be used. These include carboxymethyl cellulose, (CMC) and hydroxyethyl cellulose (HEC), and dextran, polymers of glucose having a chain-like structure with molecular weights up to 200,000. They are synthetic products and are preferred over natural viscosifiers because of greater stability and better control. HEC-R a delayed hydration type of HEC, can be used when very high viscosities are desired. The delayed action of HEC-R will allow displacement of the treated slug to, or slightly into, the formation before maximum viscosity is reached.

Natural gum viscosifiers which may be used are locust bean gum, guar gum, karaya gum, and alginates, such as Irish moss. It has been found that 1% of locust bean gum, 1.3% of gum karaya, or 1 to 2% of carboxy methyl cellulose will each serve to increase the viscosity of water to about 1000 centipoises. Guar gum furnishes aqueous solutions having viscosities of from about 100 to about 500 centipoises. It is apparent that in these concentrations it becomes economically practical to provide a sufficiently viscous aqueous solution to achieve the benefits of this invention.

These and other objects, advantages, and aspects will become apparent from a study of the accompanying disclosure, claims and drawing, in which:

The drawing illustrates a typical geological formation representative of a hydrocarbon bearing reservoir in which the petroleum is contained in a plurality of adjacent or contiguous horizons of different permeabilities within the formation, and further shows an exemplary arrangement of equipment within the well bore for carrying out the process of this invention.

Referring now to the drawing a well bore 6 has been drilled thru a hydrocarbon bearing, geological formation generally designated 7, having substantially adjacent horizons, or zones, 7U, 7M, and 7L, each of which horizons has a substantially uniform permeability in itself, but which vary in permeability relative to each other. Typically, the dissimilar formation rocks of zones 7U, 7M, and 7L, have permeabilities of 1, 10, and 100 millidarcies, respectively. A thin shale stringer 7S, occurs intermediate zones 7U and 7M. In this embodiment, the formation hydrocarbons are substantially the same viscosity in each horizon and each have an inherent viscosity of about 1 centipoise.

In bore hole 6 is installed well casing 8 to below the depth of the lowermost of said horizons to be produced, with a cement lining sealing the annular space between casing 8 and the walls of bore hole 6. The casing 8 and seal 9 are perforated in the conventional manner at the appropriate levels such as 10, to provide access from well bore 6 into the formation 7 and the producible horizons 7U, 7M, and 7L.

Tubing 11 is positioned within casing 8 to a point adjacent horizon 7U. Similarly, another tubing 12 is positioned within casing 8 to a point adjacent horizon 7M. A conventional well-pacing device 13 is placed at the level of shale stringer 7S to permit introduction of each of the fluid media into its respective zone. Thus, through tubing 11 is introduced driving fluid, preferably viscosified to a level above that of the formation fluid which flows into zone 7U, while driving fluid viscosified to a higher level is injected into zone 7M via tubing 12. Tubing 14 is positioned within casing 8 to a point adjacent horizon 7L. A second well-packing device 16 is placed at the permeability interface of zones 7M and 7L to permit separate introduction of a third driving fluid viscosified to an even higher level via tubing 14 into zone 7L, concurrent with driving fluid flow into horizons 7U and 7M.

Spaced from injection bore hole 6 is at least one other bore hole 18, which serves as a production well. Producing well 18 is cased, cemented, then casing perforated adjacent the producing horizons. The plural horizons are produced via the same casing 19. Alternatively, if it is desired to keep the formation fluids from mixing, where they are of different natures, e.g., gas and petroleum oil, a multiple tubing and packer arrangement (not shown), as described in connection with injection well 6 can be provided.

In those cases where the viscosities of the formation fluids in the different zones are the same, proper regulation of the injected fluid viscosities would give essentially the same absolute pressures at the injection well bore hole, the same pressure gradient away from the bore hole, and flood fronts the same distance from the bore hole. This would reduce cross-flow between adjacent zones, reduce channeling in the bore hole and reduce operating expenses associated with early injection fluid break-through. It would also increase ultimate secondary recovery through more uniform flushing, one zone compared to the other.

In those cases where the viscosities of the formation fluids in the separate zones are different, equal displacement of flood fronts could be accomplished with improved, but somewhat unequal, pressure distribution; or pressures, and pressure gradients, could be made essentially equal, with an improved, but somewhat unequal movement of the flood banks. Again, a reduction in the lifting cost associated with early break-through and an increased secondary recovery could be expected.

It will be noted that when operating according to the method of this invention, wherein the driving fluid viscosity is adjusted to compensate for differing formation permeabilities, or for differing formation fluid viscosities, by matching the absolute pressures, pressure gradients and injection volumes, that the interfaces between formation and driving fluids move through the producing horizons at substantially uniform rates, and are substantially the same vertical lines 21U, 21M, and 21L. Moreover, since there is substantially no pressure differential between adjacent zones, no selective plugging at permeability interfaces is required to preclude vertical flow within the formation.

Proper control of the pressures, and of the movement of the injected fluids can be accomplished through use of basic engineering formulas. First, for the flood front to move at a uniform rate through the various zones, the quantities injected into each zone must be proportioned according to the porosity and thickness of each zone, such that $$\frac{Q}{\phi h} = \text{a constant}$$

that is, (1) $$\frac{Q_1}{\phi_1 h_1} = \frac{Q_2}{\phi_2 h_2} = \frac{Q_3}{\phi_3 h_3} = \frac{Q_n}{\phi_n x h_n}$$

where $\phi$ = porosity
$Q$ = rate of injection
$h$ = zone thickness

Subscripts 1, 2, 3, and $n$, refer to zones 1, 2, 3, and $n$. After the desired injection rate into one zone (usually the least permeable zone) is determined, either through field tests or by engineering calculations, the injection rates into the other zones that will give uniform movements to the flood fronts can be determined from Formula 1 above.

It then becomes necessary to determine the viscosities of the injected fluids required to give adequate approximations of equal absolute pressures and pressure gradients away from the well bore. Darcy's law for radial flow into the formation is:

$$Q = \frac{2\pi k h (P_e - P_w)}{\mu \ln r_e/r_w}$$

when only one fluid is flowing.

Q will be a negative number because pressure differential and flow are away from rather than towards the well bore. When the injected fluid is displacing formation fluid so that two fluids of differing viscosities are flowing, Darcy's equation can be rearranged to express the pressure drop from the well bore to any point beyond the leading edge of the injected fluid.

$$\Delta P = (P_e - P_w) + (P_d - P_e)$$

(2) $$\Delta P = \frac{Q\mu_1 \ln r_e/r_w}{2\pi k h} + \frac{Q\mu_{f1} \ln r_d/r_e}{2\pi k h}$$

where $\Delta P$ = pressure drop from well bore to any point ($d$) beyond the leading edge of the injected fluid.
$P_d$ = pressure at point ($d$) beyond leading edge of the injected fluid.
$P_w$ = pressure at the well bore.
$P_e$ = pressure at interface between injected fluid and formation fluid.
$Q$ = injection rate.
$k$ = permeability of the formation rock, usually expressed in millidarcies.
$\mu_1$, $\mu_n$, etc. = viscosity of the injected fluids, with subscript number referring to the zone number.
$\mu_{f1}$, $\mu_{f2}$, etc. = viscosity of the formation fluid, with subscript number referring to the zone number.
$r_e$ = radius to interface between injected fluid and formation fluid.
$r_w$ = radius of well bore.
$r_d$ = radius to point ($d$) beyond leading edge of the injected fluid.

The second term in Equation 2 drops out, and (3) $$\Delta P = \frac{Q\mu_1 \ln r_e/r_w}{2\pi k h}$$

when calculating the pressure drop from the well bore to any point ($e$) not beyond the leading edge of injected fluid.

Use of Equations 2 and 3 permits calculation of the absolute pressures and the pressure gradient away from the well bore. Calculations are made using assumed values of injected fluid viscosities until a viscosity value is determined that will give an absolute pressure and pressure gradient which adequately matches that of the other zones.

Quite often, adequate approximations to equal absolute pressures and pressure gradients in the various zones can be made when pressure drop through the formation saturated with formation fluids is neglected. One basis is that the greatest pressure drop occurs near the well bore. Also, viscosity of formation fluids may be appreciably less than viscosity of injected fluid, and/or the zones may be partially depleted, so that injected fluid is filling gas filled space rather than moving the formation liquid. Then, the viscosities required can be calculated from the following simplified formula:

(4) $$\frac{Q_1 \mu_1}{k_1 h_1} = \frac{Q_2 \mu_2}{k_2 h_2} = \frac{Q_n \mu_n}{k_n h_n}$$

where subscripts refer to zones.

If Equations 1 and 4 are combined, it can be seen equal displacement of the flood fronts and equal pressures and pressure gradients will be realized when:

$$\frac{k_1}{\mu_1 \phi_1} = \frac{k_2}{\mu_2 \phi_2} = \frac{k_3}{\mu_3 \phi_3} = \frac{k_n}{\mu_n \phi_n}$$

A numerical example of calculations involved using simplified Equation 4 follows:

*Example*

Assumptions:
(1) Reservoir rock permeabilities are as follows:
 7U: 1 millidarcy permeability
 7M: 10 millidarcy permeability
 7L: 100 millidarcy permeability
(2) Formation fluid viscosity ($\mu$) = 1 centipoise for each zone.
(3) Formation thickness ($h$) = 10 feet for each zone.
(4) Formation porosity ($\phi$) = 10% for each zone.
(5) The desired injection rate for zone 7U is 100 barrels per day.
(6) Pure water with a viscosity of 1.0 cp. will be injected into zone 7U.

$$Q_M = \frac{Q_u}{\phi_u h_u} \phi_M h_M = \frac{100}{0.10 \times 10} \quad 0.10 \times 10 = 100 \text{ barrels per day.}$$

$$Q_L = \frac{Q_u}{\phi_u h_u} \phi_L h_L = \frac{100}{0.10 \times 10} \quad 0.10 \times 10 = 100 \text{ barrels per day.}$$

$$\mu_M = \frac{Q_u \mu_u}{k_u h_u} \frac{k_M h_M}{Q_M} = \frac{100 \times 1.0}{1.0 \times 10} \quad \frac{10 \times 10}{100} = 10 \text{ centipoises}$$

$$\mu_L = \frac{Q_u \mu_u}{k_u h_u} \frac{k_L h_L}{Q_L} = \frac{100 \times 1.0}{1.0 \times 10} \quad \frac{100 \times 10}{100} = 100 \text{ centipoises}$$

A completely uniform pressure gradient in each zone would necessitate continuous viscosity control to the values calculated above. An adequate approximation to a uniform pressure gradient can be realized by batch treatment to give average viscosities equivalent to those shown above, if batch treatments are sufficiently frequent so as to approach continuous treatment. The viscosifying characteristics of most viscosifiers are such that batch treatment is more economical than continuous treatment.

The effective average viscosity of the injected fluid under batch treatment can be determined from the following formula:

(5) $$\mu_a = \frac{\mu_1 \ln r_1/r + \mu_2 \ln r_2/r_1 \ldots + \mu_n \ln r_n/r_{n-1}}{\ln r_n/r}$$

where $\mu_a$ = effective average viscosity of the injected fluid.
$\mu_1$ = viscosity of last fluid injected.
$\mu_2$ = viscosity of next to last fluid injected.
$\mu_n$ = viscosity of first fluid injected.
$r$ = radius of well bore.
$r_1$ = radius to leading edge of last fluid injected.
$r_2$ = radius to leading edge of next to last fluid injected.
$r_n$ = radius to leading edge of first uuid injected.

The viscosity of the treated batches will of necessity be relatively high in order to obtain the desired effective average viscosity for the total injected fluid. Volumes of viscosifiers required will depend on the percentage of the total injection fluid treated and on the effective average viscosity desired. However, the volume of additives required per unit of water treated normally will range from that required to give a 10 cp. viscosity increase under continuous treatment to that required to give a 50,000 cp. viscosity increase under batch treatment. The percentage of the total water treated will normally range from 100% for continuous treatment down to 1.0% for batch treatment. Under batch treatment the frequency of injection of the treated volumes into a zone of a well will normally range from as high as a slug after injection of each 50 barrels of untreated fluid down to a slug after injection of each 50,000 barrels of untreated fluid.

Carboxymethyl cellulose sells for 81.8¢/pound in the field. If 1% of the fluids injected into zones 7M and 7L of the example were viscosified to viscosities of 1,000 cp. and 10,000 cp., respectively (to give averages of approximately 10 cp. and 100 cp. respectively), the volumes of carboxymethyl cellulose required per batch would be approximately 0.85%, and 1.5% by weight. The average cost of injected fluid would be approximately 2.4¢/barrel and 4.3¢/barrel, respectively.

As indicated previously the method of this invention may also be applied to the miscible phase flooding species of secondary recovery. This requires the selection of chemicals which are oil-soluble and particularly suited to viscosification of a hydrocarbon solvent. Hydrocarbon solvents which are employed in miscible fluid floods can be any one of a number of hydrocarbon fluids, in addition to the commonly employed liquefied petroleum gas, propane, for example. Generally the solvent to be injected may be selected from the group consisting of liquefied hydrocarbons having a hydrocarbon chain length of 3 to 4 carbon atoms.

It is suggested to use as the viscosifying agent any one of a number of oil soluble metallic soaps, which are added in an amount so as to yield a solution ranging from between 0.1 to 5.0 weight percent of said agent in said hydrocarbon solvent. A broad range of viscosities for the injected hydrocarbon solvent is obtainable in this manner. Among the metallic soaps suitable for use in this invention are: aluminum stearate, calcium stearate, iron stearate, magnesium stearate, zinc stearate, barium stearate, and copper oleate.

In some cases, it might be desirable to inject gas (gas has a very low viscosity) into the least permeable zone. This would allow use of less viscous liquids in the other zones than would be required with a liquid in the least permeable zone. Uniform pressure gradients and movement of flood fronts would still be obtained.

Reasonable variation and modification are possible within the scope of the foregoing disclosure, the drawing and the appended claims to the invention.

I claim:

1. A secondary recovery method being conducted in a hydrocarbon bearing geological formation having a plurality of contiguous horizons, said horizons having substantially different effective permeabilities, and in which one injection well and at least one producing well penetrate said formation, comprising: simultaneously injecting a differently viscosified driving fluid into each of said horizons from said injection well, the viscosity of each of said driving fluids being selected so as to match the absolute pressures, pressure gradients and injection volumes of the several horizons, whereby the injected fluids drive the formation hydrocarbons through said horizons to said producing well at substantially uniform rates.

2. A secondary recovery method being conducted in a hydrocarbon bearing geological formation having a plurality of contiguous horizons, said horizons having substantially different effective permeabilities, and in which one injection well and at least one producing well penetrate said formation, comprising:
    (a) positioning and sealing a casing into said injection well to the depth of the lowermost of said horizons to be produced;
    (b) perforating the said casing and its surrounding seal adjacent each of said horizons to be produced;
    (c) running a separate tubing into said injection well to a point approximately intermediate the ends of each of said horizons to be produced;
    (d) packing off said injection well adjacent each of the approximate interfaces of said horizons to be produced; and
    (e) simultaneously introducing a differently viscosified driving fluid into each of the packed off zones of said injection well, the viscosity of said driving fluids being selected so as to match the absolute pressures, pressure gradients, and injection volumes of the several horizons, whereby the injected fluids drive the formation hydrocarbons through said horizons to said producing well at substantially uniform rates.

3. A secondary recovery method being conducted in a hydrocarbon bearing geological formation having a plurality of contiguous horizons, said horizons having substantially different effective permeabilities, and in which one injection well and at least one producing well penetrate said formation, comprising:
    (a) positioning and sealing a casing into said injection well to the depth of the lowermost of said horizons to be produced;
    (b) perforating the said casing and its surrounding seal adjacent each of said horizons to be produced;
    (c) running a separate tubing into said injection well to a point approximately intermediate the ends of each of said horizons to be produced;
    (d) packing off said injection well adjacent each of the approximate boundaries of said horizons to be produced;
    (e) simultaneously introducing a differently viscosified aqeous solution into each of the packed off zones of said injection well, the viscosity of said aqueous solution being selected so as to match the absolute pressures, pressure gradients and injection volumes of the several horizons, whereby the aqueous solution drives the formation hydrocarbons through said horizons to said producing well at substantially uniform rates.

4. The process according to claim 3 wherein the viscosifying agent for said viscosified aqueous solution is selected from the group consisting of carboxymethyl cellulose, hydroethyl cellulose, dextran, guar flour, locust bean gum, and gum karaya.

5. A secondary recovery method being conducted in a hydrocarbon-bearing geological formation having a plurality of contiguous horizons, said horizons having substantially uniform effective permeabilities, but in which the formation fluid viscosities vary significantly relative to each other for said contiguous horizons, and in which one injection well and at least one producing well penetrate said formation, comprising: simultaneously injecting a differently viscosified driving fluid into each of said horizons from said injection well, the viscosity of each of said driving fluids being selected so as to match the absolute pressures, pressure gradients and injection volumes of the several horizons, whereby the injected fluids drive the formation hydrocarbons through said horizons to said producing well at substantially uniform rates.

6. A secondary recovery process being conducted in a hydrocarbon-bearing geological formation having a plurality of contiguous horizons, said horizons having substantially uniform effective permeabilities, but in which the formation fluid viscosities vary significantly relative to each other for contiguous horizons, and in which one injection well and at least one producing well penetrate said formation, comprising:

(a) positioning and sealing a casing into said injection well to the depth of the lowermost of said horizons to be produced;
(b) perforating the said casing and its surrounding seal adjacent each of said horizons to be produced;
(c) running a separate tubing into said injection well to a point approximately intermediate the ends of each of said horizons to be produced;
(d) packing off said injection well adjacent each of the approximate interfaces of said horizons to be produced; and
(e) simultaneously introducing a differently viscosified driving fluid into each of the packed off zones of said injection well, the viscosity of said driving fluids being selected so as to match the absolute pressures, pressure gradients and injection volumes of the several horizons, whereby the injected fluids drive the formation hydrocarbons through said horizons to said producing well at substantially uniform rates.

7. A secondary recovery process being conducted in a hydrocarbon-bearing geological formation having a plurality of contiguous horizons, said horizons having substantially uniform effective permeabilities, but in which the formation fluid viscosities vary significantly relative to each other for adjacent horizons, and in which one injection well and at least one producing well penetrate said formation, comprising:

(a) positioning and sealing a casing into said injection well to the depth of the lowermost of said horizons to be produced;
(b) perforating the said casing and its surrounding seal adjacent each of said horizons to be produced;
(c) running a separate tubing into said injection well to a point approximately intermediate the ends of each of said horizons to be produced;
(d) packing off said injection well adjacent each of the approximate boundaries of said horizons to be produced;
(e) simultaneously introducing a separately viscosified aqueous solution into each of the packed off zones of said injection well, the viscosity of said aqueous solution being selected so as to match the absolute pressures, pressure gradients and injection volumes of the several horizons, whereby the aqueous solution drives the formation hydrocarbons through said horizons to said producing well at substantially uniform rates.

8. A secondary recovery method being conducted in a hydrocarbon-bearing geological formation having a plurality of contiguous horizons, said horizons having substantially different effective permeabilities, and in which the formation fluid viscosities vary significantly relative to each other for said contiguous horizons, and further in which one injection well and at least one producing well penetrate said formation, comprising: simultaneously injecting a differently viscosified driving fluid into each of said horizons from said injection well, the viscosity of each of said driving fluids being selected so as to match the absolute pressures, pressure gradients and injection volumes of the several horizons, whereby the injected fluids drive the formation hydrocarbons through said horizons to said producing well at substantially uniform rates.

References Cited by the Examiner
UNITED STATES PATENTS

| | | | |
|---|---|---|---|
| 2,731,414 | 1/1956 | Binder et al. | 166—10 |
| 3,013,607 | 12/1961 | Bond et al. | 166—10 |
| 3,148,730 | 9/1964 | Holbert | 166—9 |

CHARLES E. O'CONNELL, *Primary Examiner.*

S. J. NOVOSAD, *Assistant Examiner.*